(12) United States Patent
Yamauchi et al.

(10) Patent No.: US 9,951,154 B2
(45) Date of Patent: Apr. 24, 2018

(54) POLYVINYLACETAL RESIN FOR HEAT-DEVELOPABLE PHOTOSENSITIVE MATERIAL AND HEAT-DEVELOPABLE PHOTOSENSITIVE MATERIAL

(71) Applicant: SEKISUI CHEMICAL CO., LTD., Osaka (JP)

(72) Inventors: Kenji Yamauchi, Shiga (JP); Jiro Miyai, Shiga (JP); Shogo Naruwaki, Shiga (JP); Takayuki Maeda, Shiga (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 15/124,103

(22) PCT Filed: Mar. 24, 2014

(86) PCT No.: PCT/JP2014/059383
§ 371 (c)(1),
(2) Date: Sep. 7, 2016

(87) PCT Pub. No.: WO2015/145781
PCT Pub. Date: Oct. 1, 2015

(65) Prior Publication Data
US 2017/0088640 A1 Mar. 30, 2017

(51) Int. Cl.
*G03C 1/498* (2006.01)
*C08F 8/28* (2006.01)
*C09D 129/14* (2006.01)
*C09D 5/26* (2006.01)
*C09D 5/32* (2006.01)

(52) U.S. Cl.
CPC .............. *C08F 8/28* (2013.01); *C09D 5/26* (2013.01); *C09D 5/32* (2013.01); *C09D 129/14* (2013.01); *G03C 1/49863* (2013.01)

(58) Field of Classification Search
CPC ....... G03C 1/498; G03C 1/49863; C08F 8/28; C09D 5/26; C09D 5/32; C09D 129/14
USPC .................................................. 430/618, 619
See application file for complete search history.

(56) References Cited

U.S. PATENT DOCUMENTS

| 5,349,014 | A | 9/1994 | Degeilh | |
|---|---|---|---|---|
| 6,730,464 | B2* | 5/2004 | Miyake | ..................... C08F 8/28 430/536 |
| 7,176,257 | B2* | 2/2007 | Miyake | ..................... C08F 8/28 430/536 |

FOREIGN PATENT DOCUMENTS

| EP | 1 270 608 | 1/2003 |
|---|---|---|
| JP | 2005-104149 | 4/2005 |
| JP | 2006-30935 | 2/2006 |
| JP | 2011-93106 | 5/2011 |
| JP | 2011-225842 | 11/2011 |

OTHER PUBLICATIONS

International Search Report and Written Opinion dated May 19, 2014 in corresponding International Application No. PCT/JP2014/059383.

* cited by examiner

*Primary Examiner* — Geraldina Visconti
(74) *Attorney, Agent, or Firm* — Wenderoth, Lind & Ponack, L.L.P.

(57) ABSTRACT

A polyvinyl acetal resin for a heat-developable photosensitive material capable of preventing skinning in the coating process of the photosensitive layer of the heat-developable photosensitive material, preventing deterioration of image characteristics and coloration of the coating solution, and suppressing the occurrence of odor at the time of producing the heat-developable photosensitive material and heat development.

The polyvinyl acetal resin for a heat-developable photosensitive material used for a photosensitive layer of the heat-developable photosensitive material has a residual acetyl group content of 25 mol % or less, residual hydroxyl group content of 17-35 mol %, and polymerization degree of 200 to 3,000, and is obtained by an acetalization of a polyvinyl alcohol mixture containing polyvinyl alcohol resins having different polymerization degrees, wherein the content of the polyvinyl alcohol having a polymerization degree of 600 or less is 50 wt % or higher in the polyvinyl alcohol mixture.

6 Claims, No Drawings

POLYVINYLACETAL RESIN FOR HEAT-DEVELOPABLE PHOTOSENSITIVE MATERIAL AND HEAT-DEVELOPABLE PHOTOSENSITIVE MATERIAL

TECHNICAL FIELD

The present invention relates to a polyvinyl acetal resin for a heat-developable photosensitive material capable of preventing skinning in the coating process of the photosensitive layer of the heat-developable photosensitive material, preventing deterioration of image characteristics and coloration of the coating solution, and suppressing the occurrence of odor at the time of producing the heat-developable photosensitive material and heat development.

BACKGROUND ART

By the photo excellent properties, the silver halide light-sensitive material has been used extensively heretofore, and has been utilized extensively in the imaging arts as a material of high quality.

However, in the silver halide light-sensitive material of the conventional art, there are problems in addition to development and fixing process being complex, and for discharging the chemical waste in a large amount, because the process is wet.

In contrast, heat-developable photosensitive materials capable of performing the heat treatment the development process have been developed and are put to practical use.

Heat-developable photosensitive material is made of a laminate of photosensitive silver layer that consists of from salt of fatty acids, organic reducing agent, small amounts of silver halide dispersed in a binder resin, and support plate such as a paper or plastic film or metal foil or glass plate.

On the other hand, polymethyl methacrylate resins and polyvinylacetal resins, cellulose acetate resins, polyvinyl acetate resins, cellulose acetate propionate resin, cellulose acetate butyrate and polyvinyl butyral resin, having excellent film forming properties are the used for the photosensitive layers of the heat developable photosensitive material. Among them, a polyvinyl acetal resin is used as the best.

These binder resins are generally used in a solvent casting method.

The resin is dissolved in a solvent such as MEK and acetone, alcohol, toluene having relatively low boiling point, and cast onto a support, and dried. This is described in many references.

The improvement of productivity of the film forming is required on the solvent casting method as described above. Reducing the time to the step of release of formed film from the step of resin solution casting onto a support is important. However, the phenomenon of skinning occurs in the process of drying the resin solution, to get the resin film. Skinning is a phenomenon that the casting film surface is solidified by drying, and the skin prevents the evaporation of solvent of inside. That occurs significantly when we use low-boiling temperature solvents.

When the skinning occurs, the problem that the image characteristics are deteriorated, because the silver particle density is lowered, had occurred.

For example, Patent Document 1 discloses a technique of preventing skinning to improve coating properties, the skinning layer is prevented from formation by using a solvent of poor solvent for the binder.

However, a new problem arose that the dispersibility of the silver particles becomes extremely worse when the poor solvent is used in the silver halide light-sensitive material.

Further, in Patent Document 2, a method of combining the three processes has been disclosed.

The method comprises the steps of first, casting the resin solution onto a support, second, applying the vacuum pressure to the support to enable the casting film to adhere to the support, and third, feeding the anti-skinning solution to the outlet of the resin solution.

This is possible to prevent the adhesion to the film or the scattering of anti-skinning solution, this method can suppress the skinning. However, there is a problem that adhesion between the support and the casting film becomes worse in this method.

CITATION LIST

Patent Literature

Patent Document 1: Japanese Kokai Publication No. 2005-104149.
Patent Document 2: Japanese Kokai Publication No. 2011-93106.

SUMMARY OF THE INVENTION

Technical Problem

As a result of various studies made for solving the aforementioned problems, it has been found a polyvinyl acetal resin for a heat-developable photosensitive material capable of preventing skinning in the coating process of the photosensitive layer of the heat-developable photosensitive material, preventing deterioration of image characteristics and coloration of the coating solution, and suppressing the occurrence of odor at the time of producing the heat-developable photosensitive material and heat development, and thus, the present invention has been accomplished.

Solution to Problem

The present invention provides a polyvinyl acetal resin for a heat-developable photosensitive material used for a photosensitive layer of the heat-developable photosensitive material, which has a residual acetyl group content of 25 mol % or less, residual hydroxyl group content of 17-35 mol %, polymerization degree of 200 to 3,000, which is obtained by an acetalization of a polyvinyl alcohol mixture containing polyvinyl alcohol resins having different polymerization degrees, the content of the polyvinyl alcohol having a polymerization degree of 600 or less being 50 wt % or higher in the polyvinyl alcohol mixture.

Below, the present invention will be described in detail.

As result of extensive studies, the present inventors have found that the following two points were important. They were the use of polyvinyl alcohol that is starting material of polyvinylacetal resins having different degree of polymerization, and the range of polymerization degree and residual acetyl group content and amount of residual hydroxyl groups of the polyvinylacetal resin. Therefore they found that it was possible to prevent skinning in the coating process, and they have completed the present invention.

In the polyvinylacetal resin of the present invention for heat-developable photosensitive material, the lower limit of the polymerization degree is 200, and, upper limit of polymerization is 3000.

By the above-mentioned range of polymerization degree, it is possible to have an excellent dispersibility of the silver salt, the coating film strength, the coating property. Further, considering the dispersion of the silver salt, the strength of the coating, the balance of the coating, a preferred lower limit of the polymerization degree is 300, a preferred upper limit of the polymerization degree is 1000.

In the polyvinylacetal resin of the present invention for heat-developable photosensitive material, preferred lower limit of acetalization degree is 40 mol %, and a preferred upper limit is 78 mol %.

If it is less than 40 mol %, it may not be used as a binder resin of the photosensitive layer of the heat developing photosensitive material, because it becomes insoluble in organic solvents. If the acetal group exceeds 78 mol %, the strength of the coating film may decrease toughness, because the polyvinylacetal resin's residual hydroxyl group amount is less. A more preferred lower limit of the acetalization degree is 65 mol %, a more preferred upper limit is 80 mol %. As used herein, the acetalization degree (mol %) is calculated by using a method for evaluating an amount of two hydroxyl groups, since the acetal group of the polyvinyl acetal resin is formed from two hydroxyl groups.

In the polyvinyl acetal resin of the invention for heat-developable photosensitive material, the upper limit of the residual acetyl group content is 25 mol %. If it exceeds 25 mol %, blocking occurs in the synthesis step of the polyvinylacetal. The preferred upper limit is 15 mol %. In addition, the more preferred lower limit of the residual acetyl group content is 0 mol %.

The lower limit of the residual hydroxyl group content of polyvinyl acetal resin for the heat-developable photosensitive material is 17 mol % and the upper limit is 35 mol % in the present invention. If it is less than 17 mol %, photographic sensitivity becomes worse, because dispersibility of the silver salt is bad.

If it is more than 35 mol %, the storage stability and photographic sensitivity of heat-developable photosensitive material becomes worse, because of fogging caused by moisture absorption. The preferred lower limit of the hydroxyl group content is 20 mol %, the preferred upper limit is 33 mol %.

The polyvinylacetal resin for heat-developable photosensitive material of the present invention is obtained by an acetalization of a polyvinyl alcohol mixture containing polyvinyl alcohol resins having different polymerization degrees, and the content of the polyvinyl alcohol having a polymerization degree of 600 or less is 50 wt % or higher in the polyvinyl alcohol mixture.

Conventionally, as methods of preventing skinning of the coating film, a method of using a plasticizer or surfactant, and method of using a high boiling solvent which is difficult to dry at drying temperature were used other than a method of using poor solvents as described above.

However, there were problems in which the adhesion of each layer was reduced in producing heat-developable photosensitive materials by these methods.

In contrast, the present invention is effectively capable of preventing the occurrence of skinning, due to the use of the polyvinyl alcohols having different polymerization degree of polyvinyl alcohol as a raw material, and defining the ratio of the polyvinyl alcohol having a predetermined polymerization degree.

The polyvinylacetal resin for heat-developable photosensitive material of the present invention is obtained by an acetalization of a polyvinyl alcohol mixture containing polyvinyl alcohol resins having different polymerization degrees.

In order to use polyvinyl alcohol resins having different polymerization degree in this manner, it is possible to obtain two advantages.

The first advantage is to increase the viscosity of the emulsion slurry by using the high polymerization polymer. Another advantage is to improve the dispersion of the silver halide by the low polymerization polymer.

The "polyvinyl alcohol resins" is not limited to the case of 2 polyvinyl alcohol resins; it is also intended to include the case of 3 or more polyvinyl alcohol resins.

In the present invention, the content of the polyvinyl alcohol having a polymerization degree of 600 or less is 50 wt % or higher in the polyvinyl alcohol mixture. As a result, it is possible to effectively prevent the occurrence of skinning in the coating step. The content of the polyvinyl alcohol having a polymerization degree of 600 or less is preferably 60 wt % or more. The polyvinyl alcohol having a polymerization degree of 600 or less preferably has polymerization degree of 200 to 600.

In the polyvinyl alcohol mixture, a polyvinyl alcohol other than the polyvinyl alcohol having a polymerization degree of 600 or less preferably has polymerization degree of 800-3000. Thus, it is possible to reduce the total amount of the binder resin to be added to the slurry because it is easy to increase the viscosity of the silver chloride slurry. Further, in the polyvinyl alcohol mixture, the difference of polymerization degree is preferably 1100 to 2200. Thus, it can be compatible for both coating properties and dispersibility, the drying of the slurry. It should be noted that the difference of the polymerization degree is the difference of the lowest polymerization degree and the highest polymerization degree.

The preferred lower limit of the saponification degree of the polyvinyl alcohol in polyvinyl alcohol mixture is 75 mol %, the preferred upper limit is 100 mol %. If the saponification is less than 75 mol %, it may not obtain a uniform composition, and therefore the polyvinylacetal resin particles coalesce in the synthesis process.

It is desirable that the residue of halogen ion and aldehyde is removed by water washing the heat-developable light-sensitive material of the present invention, because the residual aldehyde is cause of the odor at the development and the residual halogen ion inhibits the development property.

On this purpose, it is good that the particle size of polyvinylacetal resin is as small as possible. So it is easy to remove the impurities by water washing. In order to control the polyvinylacetal particle size, it is preferable that the polyvinyl alcohol resin has as high saponification degree as possible.

In the polyvinyl acetal resin for the heat-developable photosensitive material of the present invention, it is preferable that the resin has the 0.1 to 5 mol % of at least one functional group selected from the functional groups shown in the following general formulas (1) to (6) in the side chain.

[Chemical formula 1]

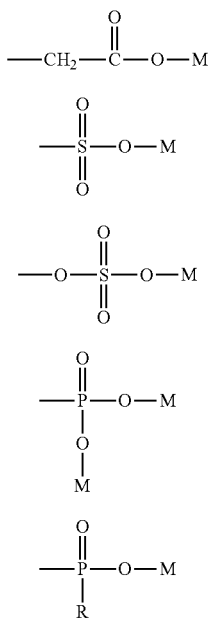

In the formulas, M represents K H, Li, or Na, R represents an alkyl group having 1 to 20 carbon atoms or a hydrogen atom.

Since the functional groups have a hydrophilic property, it is assumed that dispersion of the silver salt in the heat-developable photosensitive material is improved, and excellent sharpness of the image and tone are obtained. Further, it is possible in the case of using the heat-developable photosensitive material, to prevent deterioration of photo characteristics and coloration of the coating solution.

The functional group represented by the above general formula (1) is, for example, it is carboxyl group. Examples of the alkyl group include those having 1 to 10 carbon atoms, concretely that is methyl group, ethyl group, isopropyl group, butyl group, t-butyl group, cyclohexyl group.

The tertiary amine groups are, for example, trimethylamine, triethylamine, triethanolamine, tripropylamine, tributylamine.

A preferred lower limit of the content of the functional groups is 0.1 mol %, the upper limit is preferably 5 mol %. When it is less than 0.1 mol %, the effect of introducing the functional group, i.e., may not be obtained the effect of improving dispersibility of the silver salt of the reducible non-photosensitive silver salt. When it is more than 5 mol %, the effect of improving dispersibility of reducible non-photosensitive silver salt is not only saturated, but solubility in solvents is deteriorated.

In the invention, in the polyvinylacetal resin for the heat-developable photosensitive material, the content of each alkali metal, alkaline earth metal, halide ions, sulfate ions and nitrate ions is preferably 100 ppm or less. In particular, when the content of the halogen ion is more than 100 ppm, storage stability of the coating solution is deteriorated. Also, sometimes the storage stability of the photosensitive material is deteriorated, causing fogging. In order to set the upper limit of the alkali metal to 100 ppm, alkaline earth metal, halide ions, sulfate ions and nitrate ions, for example, a method of using the halogen-free catalyst is used in the acetalization reaction. Then, if the halogen catalyst is used, the resin is purified by washing operation with a mixed solution such as water, water/alcohol, is removed to the specified amount or less. The more preferred upper limit is 50 ppm.

In the invention, in the polyvinylacetal resin for the heat-developable photosensitive material, the amount of residual alkaline material for resin is preferably is 0.01 wt % or less.

In particular, if the content of the alkali substance is more than 0.01 wt %, storage stability of the coating solution and storage stability of the film are deteriorated. In order to set the upper limit of the content of the alkaline residue material to 0.01 wt %, we used for example, a method in which the excess alkaline substances are washed with mixed solution of water or water/alcohol after neutralization in the acetalization reaction and a method of using the volatile alkaline neutralizing agent, and the alkali material is removed by heating. The more preferred upper limit is 0.005 wt %.

In the present invention, the preferred upper limit of the water content of the polyvinylacetal resin for the heat-developable photosensitive material is 3.0 wt %.

If it is more than 3.0 wt %, the strength of the coating layer becomes insufficient, since the pot life of heat developing photosensitive materials falls and it reacts with a crosslinking agent which has an isocyanate group added for the purpose of strengthening of a coat layer of the heat-developable photosensitive material. The more preferred upper limit is 2.5 wt %.

In the invention, the preferred upper limit of the content of 2-ethyl-2-hexenal of polyvinylacetal resin for the heat-developable photosensitive material is 60 ppm. For example, the 2-ethyl-2-hexenal, is produced by dehydration after the aldehyde which was used during the acetalization of the polyvinyl alcohol resin is combined by aldol condensation. It becomes the cause of smell if the 2-ethyl-2-hexenal content exceeds 60 ppm. Because it is volatilized at heat development or the production of the heat-developable photosensitive material, the human senses smell.

It is not limited to the method in which the content of 2-ethyl-2-hexenal is 60 ppm or less.

The 2-ethyl-2-hexenal is generated under the condition of high temperature and high alkaline strength in the neutralization process. For example, the method for inhibiting the production of the 2-ethyl-2-hexenal is keeping the temperature not too high in alkaline conditions or neutralization step. Further, there is a washing method that whereby 2-ethyl-2-hexenal is washed with distilled water.

In the method of washing 2-ethyl-2-hexenal with distilled water, if the particle size of polyvinylacetal resin is large, the cleaning efficiency is deteriorated in the cleaning process and it may not be possible to sufficiently remove 2-ethyl-2-hexenal.

In this case, even if a cleaning time is longer, the inside of the resin cannot be cleaned sufficiently, and the content of the 2-ethyl-2-hexenal may not be reduced to 60 ppm or less. Therefore, in order to increase the washing efficiency, it is necessary to reduce the particle size of the polyvinylacetal resin.

As a method of reducing the particle size of the particles of the polyvinylacetal resin, for example, there are a method of washing only particles of the polyvinylacetal resin capable of passing through a #60 mesh sieve before washing, a method of milling the particles of the polyvinylacetal resin by the ball mill to pass through the #60 mesh sieve, in order to increase the production yield, a method of producing particles capable of passing through the #60 mesh sieve by controlling the reaction conditions such as a reaction temperature. Among them, the method of washing only particles of the polyvinylacetal resin capable of passing through #60 mesh sieve is particularly preferred. It means that #60 mesh has the 60 metal wire in one inch around. The #60 mesh has open area size of about 250 microns.

Here, the particle size of particles capable of passing through the #60 mesh sieve, can be confirmed by optical microscope. The polyvinylacetal resin is ground and chooses particles of 50 to 100 at random.

At this time, the preferable lower limit of the ratio of the particles having the particle size of 35 µm or less is 80%. If it is less than 80%, reaction efficiency with alkali neutralization time may be reduced. A more preferred lower limit is 95%.

Further, in the washing step, in order to prevent contamination of the impurities contained in the wash water, the use of pure water or distilled water is preferable. However, if the particle size of the polyvinylacetal resin for the heat-developable photosensitive material is too small, the resin tends to scatter, and the handling property is deteriorated. So, it is possible to perform steps as necessary, to granulate after washing.

There is no particular limitation to the method of granulating of the polyvinylacetal resin for the heat-developable photosensitive material. For example, there is a method that the particles of the resin are dispersed in water and they are heated, so that the particles are bonding together, after washing.

Further, there is a method of pressing the resin at room temperature, heating to the plate, and then grinding to preferred size after drying the resin.

The method of granulating the polyvinylacetal resin for the heat-developable photosensitive material is not particularly limited, for example, rolling granulation, extrusion granulation, compression granulation, stirring granulation, spray drying method, dissolution coagulation method, are shown. The compression granulation method is the most preferable.

By granulating the powder of the polyvinylacetal resin for the heat-developable photosensitive material, it dissolves in solvent easily, and handling is significantly improved, because the powder is not scattered.

The bulk density of the polyvinylacetal resin for heat-developable photosensitive material is not particularly limited, 0.3 to 0.5 $cm^3/g$ is preferable, 0.34 to 0.46 $cm^3/g$ is more preferable.

The granulated resins made in these ranges have both solubility in solvent and preferred handling properties.

The production method of the polyvinylacetal resin for heat-developable photosensitive material of the invention is made by acetalization of polyvinyl alcohol mixture as described above.

It is not limited to the specific method of the acetalization. For example, there is the acetalization method whereby acid catalyst and aldehyde are added into the aqueous polyvinyl alcohol mixed solution.

It is not particularly limited for the aldehyde. For example, formaldehyde, acetaldehyde, propionaldehyde, butyraldehyde, amyl aldehyde, hexyl aldehyde, heptyl aldehyde, 2-ethylhexyl aldehyde, cyclohexyl aldehyde, furfural, glyoxal, glutaraldehyde, benzaldehyde, 2-methyl benzaldehyde, 3-methyl benzaldehyde, 4-methyl benzaldehyde, p-hydroxybenzaldehyde, m-hydroxybenzaldehyde, phenylacetaldehyde, and β-phenylpropionaldehyde, are shown. Among these, it is preferred that only butyraldehyde or acetaldehyde is used. Further, it is preferred that a combination of butyraldehyde and acetaldehyde is used.

If the butyraldehyde and acetaldehyde are used, the sharpness of the image and the gradation portion are excellent. The dispersion of the silver salt heat-developable photosensitive material is improved, hot-melt ability, cool-solidify ability, etc becomes sharper, because it makes possible to accurately control the nuclear growth of silver salt.

The preferred lower limit of the ratio of the portion acetalized with acetaldehyde is 30% of the total acetal group.

In some cases, if it were less than 30%, the sharpness and resolution of the image become insufficient. Since the glass transition temperature of the polyvinyl acetal resin is 80° C. or less, nucleation of the photosensitive silver salt of the heat-developable photosensitive material proceeds. Further, the dispersibility of the silver salt cannot be obtained sufficiently. The more preferred lower limit is 50%.

The acid catalyst is not particularly limited, both organic acids and inorganic acids may be used.

For example, acetic acid, p-toluene sulfonic acid, nitric acid, sulfuric acid, hydrochloric acid are shown. Further, in order to stop the synthesis reaction, alkali neutralization is carried out.

For example the alkalis used in the neutralization are sodium hydroxide, potassium hydroxide, ammonia, sodium acetate, sodium carbonate, sodium hydrogencarbonate, potassium carbonate, potassium hydrogen carbonate.

In the above the acetalization, usually, the antioxidant is added in order to prevent oxidation of the resin and prevent oxidation of the aldehyde, and improve the heat resistance.

However, it is preferable that the polyvinylacetal resin does not contain antioxidants which are bisphenol-based, a phosphoric acid type, and hindered phenol usually used as antioxidant.

Sometimes such antioxidants remain in the polyvinyl acetal resin, thereby reducing sharpness and causing fog, because they cause deterioration of the storage stability of the film and deterioration of the storage ability of the coating solution.

The method of making the polyvinylacetal resin for heat-developable photosensitive material which has functional groups in side chain described above is as follows. For example, a method of copolymerizing the vinyl ester and the monomer having functional group and acetalizating the polyvinyl alcohol resin obtained by saponifying of the copolymer and a method of using the hydroxyl group of the polyvinylacetal resin or a polyvinyl alcohol resin and introducing functional groups are used. The monomer having the functional group is shown as, for example, acrylic acid, maleic acid, itaconic acid.

In the invention, the polyvinylacetal resin for the heat-developable photosensitive material is preferably washed after the acetalization. Thus, in particular, it is possible to reduce the content of 2-ethyl-2-hexenal. The details of the cleaning step are described above.

A heat-developable photosensitive material can be prepared by the following procedure.

First, one mixes the polyvinylacetal resin for heat-developable photosensitive material of the invention, an organic silver salt, photosensitive silver halide, silver ion reducing agents, crosslinking agents, solvents and additives. Next, the mixed solution is coated on a support and dried.

The heat-developable photosensitive material containing organic silver salt, silver ion reducing agent and light-sensitive silver halide in addition to polyvinylacetal resin for the heat developable photosensitive material is also included in the invention.

In the invention, the preferred lower limit of the content of polyvinylacetal resin for the heat-developable photosensitive material in the photosensitive layer, (heat-developable photosensitive material for polyvinyl acetal resin of the present invention: organic silver salt) weight ratio of the organic silver salt, 1:10, the preferred upper limit is 10:1.

If less than 1:10, it is not possible to improve the adhesion between the layers constituting the heat-developable photosensitive material. If it is more than 10:1, the image becomes blurred. The more preferred lower limit is 1:5, the more preferred upper limit is 5:1. In the invention, the preferred lower limit of the content of the polyvinyl acetal resin for the heat-developable photosensitive material in all of the photosensitive layer is 5 wt %, the preferred upper limit is 20 wt %. In this range, the photo quality may be improved, because dispersibility of the silver halide in the slurry becomes good.

The organic silver salt is white or colorless and relatively stable to light.

When it is heated at 80° C., the photosensitive silver halide reacts with the silver ion reducing agent and it yields the silver metal.

The organic silver salt is not particularly limited. For example, silver salts of organic compounds having a carboxyl group mercapto group, or a thione group, and silver benzotriazole are known.

Specifically, a silver salt of a compound having mercapto group or thione group, a silver salt of 3-mercapto-4-phenyl-1,2,4-triazole, a silver salt of 2-mercapto-benzimidazole, a silver salt of 2-mercapto-5-aminothiazole, a silver salt of 1-phenyl-5-phenyl-mercaptotetrathiazole, a silver salt of 2-mercapto-benzothiazole, a silver salt of thioglycolic acid, a silver salt of dithiocarboxylic acid such as a silver salt of dithioacetic acid, thioamide silver, a silver salt of thiopyridine, a silver salt of dithiohydroxybenzol, a silver salt of mercaptotriazine, a silver salt of mercaptooxadiazole, a silver salt of an aliphatic carboxylic acid, such as capric acid silver, lauric acid silver, myristic acid silver, palmitic acid silver, stearic acid silver, behenic acid silver, malic acid silver, fumaric acid silver, silver tartrate, furoin silver, linoleic acid silver, oleic acid silver, hydroxystearic acid silver, adipic acid silver, sebacic acid silver, silver acetate, butyric acid silver, oxalic acid silver, aromatic carboxylic acids silver, thiocarboxylic acid silver, aliphatic carboxylic silver having thioether group, a silver salt of tetrazaindene, S-2-amino phenyl silver thiosulfate, including metal amino alcohols, and organic acid metal chelates can be used.

The preferred lower limit of the average particle size of the organic silver salt is 0.01 μm, and the preferred upper limit is 10 μm. When it is used in the above range of average particle size of the organic silver salt, dispersibility is good, and high photo density can be obtained.

The more preferred upper limit is 0.2 μm, and the preferred lower limit 5 μm.

The photosensitive silver halide is not particularly limited. For example, silver bromide, silver iodide, silver chloride, silver chlorobromide, silver iodobromide, silver iodide salt are shown. In addition, the above-mentioned light-sensitive silver halides are chemically sensitized by sensitizing agent.

The methods of chemical sensitization of the photosensitive silver halide are not particularly limited.

For example, sulfur sensitization, selenium sensitization, tellurium sensitization method, are shown.

The photosensitive silver halide may be chemically sensitized by the reduction sensitization method, noble metal sensitization method using a sensitizer of platinum, palladium, iridium compounds, a sensitizer such as ascorbic acid, thiourea dioxide, etc.

The photosensitive silver halide is preferably spectrally-sensitized by combination of sensitizing dyes. By combining the sensitizing dyes, it is possible to spectrally sensitize to the absorption wavelength range of the desired light-sensitive silver halide, depending on the wavelength range of the light source.

The preferred lower limit of the content of the photosensitive silver halide is 0.0005 parts by weight per 100 parts by weight of the organic silver salt. In addition, the preferred upper limit is 0.2 parts by weight. If it is less than 0.0005 parts by weight, the image after development becomes unclear.

If it exceeds 0.2 parts by weight, the image after development becomes cloudy. A more preferred lower limit is 0.01 parts by weight.

The reducing agent is not particularly limited as long as it is any substance which reduces silver ions into metallic silver. For example, chlorophenols, bisphenols, naphthols, bisnaphthol, polyhydroxybenzenes, dihydroxy naphthols, polyhydroxy naphthols, dihydroxy naphthalenes, polyhydroxy naphthalenes, hydroquinone, hydroquinone monoether, ascorbic acid or ascorbic acid derivative, reducing saccharide, aromatic amino compounds, hydroxylamines, hydrazines, phenidones, hindered phenols, are shown. Among them, photodegradable reducing agent is preferably used. Thermally decomposable reducing agent may also be used.

Furthermore, it can be used in combination with compounds that promote photodegradation. It can also be used in combination with agents that inhibit the reaction of a reducing agent with silver halide.

The preferable lower limit of the content of the reducing agent is 0.0001 parts by weight per 100 parts by weight of the organic silver salt. The preferred upper limit is 3.0 parts by weight.

It is possible by the above-mentioned range, to appropriately reduce the organic silver salt.

The more preferred lower limit is 0.01 parts by weight. The upper limit is more preferably 1.0 parts by weight.

The additive is not limited particularly, for example, the color formulations are shown.

The color formulation has a function to participate in the redox reaction with reducing agent and the organic silver salt, and the black silver image produced. The color formulation is not particularly limited. For example, imides, naphthol imides, mercaptans, N-(aminomethyl) aryldicarboximides, and blocked pyrazoles, phthalazinone, or phthalazinone derivatives, metal salts of phthalazinone derivatives, phthalazine, phthalic acid, and 2,3-naphthalene dicarboxylic acid, or o-phenylene acid derivatives, anhydride of phenylene acid derivatives, quinazolinediones, benzoxazine, phtoxazine derivatives, 2,4-benzoxazin, pyrimidines, tetraazapentalene derivatives are shown. Among these, phthalazine is preferred.

The support or substrates are not particularly limited. For example, polyesters such as polyethylene terephthalate, polyethylene naphthalate, and polycarbonate, polyolefins such as polyethylene and polypropylene, polyvinylacetals, polyimides, cellulose esters such as nitrocellulose, cellulose diacetate, cellulose triacetate, plastic film made of vinyl chloride resin, chlorinated polypropylene, metal plate or glass, paper, aluminum are shown. Among these, polyethylene terephthalate is preferred.

The preferred lower limit of the amount of silver that is applied onto the support is 0.1 g per 1 m² of support. The upper limit is 5 g. The more preferred lower limit is 0.3 g, and the more preferred upper limit is 3 g. If it is less than 0.1 g, the image density may become low, and if it exceeds 5 g, there is no improvement in image density.

In the invention, the specific method of manufacturing the heat developable photosensitive material is not limited. As methods of making the heat developable photosensitive material, the following may be mentioned. For example, mixing in a ball mill solvent, polyvinylacetal resin, organic silver salt, silver ion reducing agent, photosensitive silver halide, and additives, and dispersing in solution.

Then, the solution is coated on a support and dried.

Note that the photosensitive silver halide, may be formed by the action of light-sensitive silver halide forming component in the organic silver salt and the photosensitive silver halide of a portion of an organic silver salt.

In the invention, the above reducing agent and the organic silver salt, were mixed in the polyvinylacetal resin for heat-developable photosensitive material in a batch, to form a photosensitive layer further on the support. In addition, the polyvinylacetal resin for the heat-developable photosensitive material and reducing agent and the organic silver salt are mixed separately, thereby forming a photosensitive layer and the two layers can be laminated to each other.

Furthermore, the photosensitive layer may be formed on both surfaces of the substrate, and also may be formed on only one surface of the support.

There is no particular limitation for the solvent. In the invention, it is possible to use any solvent which can dissolve the polyvinylacetal resin for the heat-developable photosensitive material.

Then, having less water content is preferable.

For example, specifically, ketones such as diethyl ketone, methyl ethyl ketone, methyl isobutyl ketone, and esters such as methyl acetate, ethyl acetate, propyl acetate can be used.

In the case of using ethanol, n-propyl alcohol, isopropyl alcohol, it is preferred to use the dehydrated grade.

Advantageous Effects of Invention

By the invention, it can be provided a polyvinylacetal resin for a heat-developable photosensitive material and the heat-developable photosensitive material satisfies the following.

In other words, it can prevent skinning in coating process of the photosensitive layer of the heat-developable photosensitive material. Then it is possible to prevent the deterioration of the photo characteristics and coloration of the coating solution.

Further, it is possible to suppress the occurrence of odor at the time of heat development and production of the heat-developable photosensitive material.

DESCRIPTION OF EMBODIMENTS

The invention is further illustrated by the following examples, but the present invention is not limited to these examples.

Example 1

50 g of polyvinyl alcohol in which saponification degree was 98%, polymerization degree was 600, and 26 g of polyvinyl alcohol in which saponification degree was 98%, polymerization degree was 800, and 24 g of polyvinyl alcohol in which saponification degree was 98%, polymerization degree was 1700, were dissolved in 700 g of distilled water by heating.

The solution was kept at 20° C., then 26 g of 70% nitric acid was added, and 16 g butylaldehyde was added further.

Then it was cooled to 10° C., and 70 g butylaldehyde was added.

After the resin precipitated, and held for 30 minutes, then 93 g nitrate was added and kept for 6 hours, and the temperature was raised to 35° C.

After the end of the reaction, flushing for 10 hours with distilled water followed, and the polyvinylbutyral resin was dehydrated after washing. The only particles capable of passing through a #60 mesh sieve were dispersed in distilled water and then sodium hydroxide was added to adjust to pH 8. After holding for 6 hours at 50° C., the solution was cooled.

Then, the solution was washed with running distilled water for 2 hours, then dehydrated and dried at 40° C. for 12 hours, then the polyvinylacetal resin particles were ground by a mortar, sieved by a #60 mesh sieve, and then the only particles capable of passing through the sieve were washed for 10 hours with running distilled water.

The polyvinyl acetal resin was gained after washing, dewatering, and drying.

The residual acetyl group content of the obtained polyvinyl acetal resin was 1.7 mol %, and the residual hydroxyl group content was 20 mol %. The ratio of the particles having a particle size of 35 µm or less was 96% in the obtained polyvinyl acetal resin.

Then, the obtained polyvinyl acetal resin was subjected to granulation treatment by passing the resin through two rolls provided with a concave recess on the roll surface. The obtained powder was sieved by a #50 mesh sieve and ungranulated powder was removed and then polyvinyl acetal resin powder was obtained.

Example 2

Except for using 35 g of polyvinyl alcohol in which saponification degree was 98%, polymerization degree was 600, and 26 g of polyvinyl alcohol in which saponification degree was 98%, polymerization degree was 400, and 21 g of polyvinyl alcohol in which saponification degree was 98%, polymerization degree was 800, and 18 g of polyvinyl alcohol in which saponification degree was 98%, polymerization degree was 2400, the experiments were conducted in the same manner as in Example 1.

The residual acetyl group content of the obtained polyvinylacetal resin was 1.1 mol %, and the residual hydroxyl group content was 28 mol %.

The ratio of particles having a particle size of 35 µm or less was 98% in the obtained polyvinyl acetal resin.

The polyvinyl acetal resin powder was obtained by performing granulation in the same manner as in Example 1.

Example 3

95 g of polyvinyl alcohol in which saponification degree was 98%, polymerization degree was 600, and 37 g of polyvinyl alcohol in which saponification degree was 98%, polymerization degree was 1700 (the composition ratio of the polyvinyl alcohol having a degree of polymerization of 600 or less was 72%), were dissolved in 1600 g of distilled water by heating.

The solution was kept at 20° C., then 90 g of 70% nitric acid was added, and 28 g acetaldehyde was added further.

Then it was cooled to 13° C., and 36 g butyraldehyde was added. After the resin was precipitated, and held for 30 minutes, then it was kept for 5 hours, and the temperature was raised to 55° C.

After the end of the reaction, flushing for 10 hours with distilled water followed, and the polyvinylacetal resin was dehydrated after washing. The only particles capable of passing through a #60 mesh sieve were dispersed in distilled water and then sodium bicarbonate was added to adjust to pH 8. After holding for 6 hours at 50° C., the solution was cooled. After cooling, pH was 8.

Then, the solution was washed with running distilled water for 2 hours, then dehydrated and dried at 40° C. for 12 hours.

The polyvinylacetal resin particles were ground by a mortar, sieved by a #60 mesh sieve, and then the only particles capable of passing through the sieve were washed for 10 hours with running distilled water.

The polyvinyl acetal resin was gained after washing, dewatering, and drying.

The residual acetyl group content of the obtained polyvinyl acetal resin was 1.8 mol %, and the residual hydroxyl group content was 26 mol %.

The acetacetal degree of the obtained polyvinylacetal resin was 37.3 mol % (51.7% per total acetal), and the butylalization degree was 34.9 mol %. The ratio of the particles having the particle size of 35 μm or less was 95% in the obtained polyvinyl acetal resin.

The polyvinyl acetal resin powder was obtained by performing granulation in the same manner as in Example 1.

Example 4

Except for using 98 g of polyvinyl alcohol in which saponification degree was 98%, polymerization degree was 400, and 34 g of polyvinyl alcohol in which saponification degree was 98%, polymerization degree was 2400, the experiments were conducted in the same manner as in Example 3.

The residual acetyl group content of the obtained polyvinylacetal resin was 1.3 mol %, and the residual hydroxyl group content was 23 mol %.

The ratio of particles having a particle size of 35 μm or less was 98% in the obtained polyvinyl acetal resin.

The polyvinyl acetal resin powder was obtained by performing granulation in the same manner as in Example 1.

Comparative Example 1

Except for using a polyvinyl alcohol resin with polymerization degree 1700, experiments were conducted in the same manner as in Example 3.

The residual acetyl group content of the obtained polyvinyl acetal resin was 1.9 mol %, and the residual hydroxyl group content was 30 mol %. The acetacetal degree of the obtained polyvinylacetal resin was 40.1 mol % (58.9% per total acetal), and the butylalization degree was 28.0 mol %. After the reaction and grinding step, except the process of sieving by using a #60 mesh sieve, polyvinyl acetal resin powder was obtained in the same manner as in Example 1.

Comparative Example 2

Except for using a polyvinyl alcohol resin in which polymerization degree was 900, experiments were conducted in the same manner as in Example 3.

The residual acetyl group content of the obtained polyvinyl acetal resin was 1.2 mol %, and the residual hydroxyl group content was 25 mol %. The acetacetal degree of the obtained polyvinylacetal resin was 50 mol % (79.4% per total acetal), and the butylalization degree was 13.0 mol %. After the reaction and grinding step, except the process of sieving by using a #60 mesh sieve, polyvinyl acetal resin powder was obtained in the same manner as in Example 3.

(Evaluation)

The polyvinyl acetal resin powders obtained in Examples 1 to 4 and Comparative Examples 1 to 2 were evaluated by the following methods. The results are shown in Table 1.

(1) Bulk Specific Gravity

By the method of JIS K6720, bulk specific gravity of the obtained the polyvinylacetal resin particles was measured.

(2) Evaluation of Handling Properties of Polyvinylacetal Resin 14 g of the obtained polyvinylacetal resin was placed in a 100 ml-glass bottle with a lid.

The resin was dissolved in 56 g of MEK: ethanol (2:8) mixed solution.

In this case, handling property was evaluated according to the following criteria.

◯: Polyvinyl acetal resin powder could be put into a bottle at once.

X: Polyvinyl acetal resin powder could not be put into a bottle at once.

It is necessary to introduce it into the bottle several times while dissolving it.

(3) Evaluation of the Skinning of Coating Layer

By using the applicator which is set at 10 mil, the resin solution prepared in "(2) Evaluation of handling properties of polyvinylacetal resin" is coated on the PET film and dried for 15 minutes in a 60° C. oven. Then, the surface condition of the coating film was evaluated.

◯: There was no wrinkle and smooth surface was obtained.
X: There was rough surface, wrinkle, or bubbles due to skinning.

(4) Content of 2-ethyl-2-hexenal

The content of 2-ethyl-2-hexenal in the obtained the polyvinyl acetal resin was measured by Gas chromatography which is connected headspace (Tekmer Dohrmann Co., Ltd.)

(GPC: manufactured by Shimadzu Corporation, GC-14, column: TC-WAX PEG using a 0.25 mm×30 m).

(5) Measurement of the Content of Ions

The content of sodium ions was evaluated by elemental absorption method.

In addition, the content of nitrate ions was evaluated by ion chromatography.

(6) The Evaluation of Coloring of Organic Silver Salt Solution 5 g of the obtained polyvinyl acetal resin powder, 5 g of silver behenate, 40 g of methyl ethyl ketone were mixed in a ball mill for 24 hours. Then, 0.2 g of N-lauryl-1-hydroxy-2-naphthamide was added, thereby producing a coating solution by ball-milled again. These solutions were observed for color changes under a fluorescent lamp for 3 days at room temperature indoors.

The evaluation was done by the following criteria.

◯: There was no change from white.
X: Coloration was observed.

(7) Image Evaluation

The coating solution prepared in "(6) The evaluation of coloring of organic silver salt solution" was applied on to the polyester substrate and dried so that the thickness after drying was 10 μm.

On this coated surface, a solution which had the following composition was coated.

Solution composition: N, N-dimethyl-p-phenylenediamine sulfate 0.5 g, polyvinylpyrrolidone 2 g, methanol 30 mL The dried coating thickness after drying was 1 μm, so that a photosensitive film was obtained.

The obtained photosensitive film was exposed for 0.3 seconds at a distance of 20 cm with high pressure mercury such as 250 watt through gradation pattern film.

Then, it was obtained a pattern image of cyan color by heating for 5 seconds using a hot plate of 120° C.

By exposure to white light of the pattern image obtained, a change in the contrast of the pattern image was observed.

The evaluation was done by the following criteria.

◯: There was no change.

X: Change was observed.

(8) Smell

During producing the photosensitive film at the time of "(7) Image evaluation", and the heat development, the presence of smell was confirmed by a functional test. Evaluation based on the following criteria.

◯: Smell could not be felt.

X: Smell was felt.

As shown in Table 1, the obtained polyvinyl acetal resin in Examples 1 to 4, the average of polymerization degree was about 900. Skinning was not observed, the condition of the dry film was good, and the change of the pattern image and the coloring of the coating solution were not observed either.

In addition, the content of 2-ethyl-2-hexenal was low, bad smell could not be felt during thermal development and photosensitive film production.

In contrast, polyvinyl acetal resins obtained in Comparative Examples 1 and 2, the skinning state was observed on the surface of the dry film. There were changes in both the coloring of the pattern image and the coating solution. Smell was detected at the development or during production of the photosensitive film.

The invention claimed is:

1. A polyvinyl acetal resin comprising
a residual acetyl group content of 25 mol % or less, residual hydroxyl group content of 17-35 mol %, and having a polymerization degree of 200 to 3,000, wherein:
the polyvinyl acetal resin is obtained by an acetalization of a polyvinyl alcohol mixture containing polyvinyl alcohol resins having different polymerization degrees, and the polyvinyl alcohol mixture comprises 60% or more of polyvinyl alcohol having a polymerization degree of 600 or less, and
the polyvinyl acetal resin is capable of use as a photosensitive layer of a heat-developable photosensitive material.

2. The polyvinyl acetal resin according to claim 1, comprising 60 ppm or less of 2-ethyl-2-hexenal.

TABLE 1

| | Polyvinyl alcohol | | | Polyvinylacetal resin | | | | |
|---|---|---|---|---|---|---|---|---|
| | Polymerization degree | Saponification degree (mol %) | Mixing ratio (Wt %) | Polymerization degree | Acetyl group content (mol %) | Hydroxyl group content (mol %) | Acetalization degree (mol %) | Bulk specific gravity (g/cm³) |
| Example 1 | 600 | 98 | 50 | 900 | 1.7 | 20 | 78.3 | 0.335 |
| | 800 | 98 | 26 | | | | | |
| | 1700 | 98 | 24 | | | | | |
| Example 2 | 600 | 98 | 35 | 900 | 1.1 | 25 | 70.9 | 0.375 |
| | 400 | 98 | 26 | | | | | |
| | 800 | 98 | 21 | | | | | |
| | 2400 | 98 | 18 | | | | | |
| Example 3 | 600 | 98 | 72 | 900 | 1.8 | 26 | 72.2 | 0.42 |
| | 1700 | 98 | 28 | | | | | |
| Example 4 | 400 | 98 | 74 | 900 | 1.3 | 24 | 74.7 | 0.455 |
| | 2400 | 98 | 26 | | | | | |
| Comparative Example 1 | 1700 | 98 | 100 | 1700 | 1.9 | 30 | 68.1 | 0.215 |
| Comparative Example 2 | 900 | 98 | 100 | 900 | 1.2 | 25 | 73.8 | 0.285 |

| | Evaluation | | | | | | |
|---|---|---|---|---|---|---|---|
| | Handling | Skinning | Content of 2-ethyl-2-hexenal (ppm) | Content of ions Na⁺/NO₃⁻ (ppm) | Coloring | Image evaluation | Smell |
| Example 1 | ◯ | ◯ | 28 | 25/20 | ◯ | ◯ | ◯ |
| Example 2 | ◯ | ◯ | 48 | 70/75 | ◯ | ◯ | ◯ |
| Example 3 | ◯ | ◯ | 33 | 55/60 | ◯ | ◯ | ◯ |
| Example 4 | ◯ | ◯ | 50 | 80/90 | ◯ | ◯ | ◯ |
| Comparative Example 1 | X | X | 137 | 210/220 | X | X | X |
| Comparative Example 2 | X | X | 140 | 280/320 | X | X | X |

3. The polyvinyl acetal resin according to claim 1, comprising 100 ppm or less of each of alkali metal, alkaline earth metal, halide ions, sulfate ions and nitrate ions.

4. The polyvinyl acetal resin according to claim 1, which is obtained by washing only particles which are able to pass through #60 mesh sieve after the acetalization.

5. The polyvinyl acetal resin according to claim 1, which is granulated by compression granulation.

6. A heat-developable photosensitive material comprising a support and a photosensitive layer formed on the support, wherein the photosensitive layer contains the polyvinyl acetal resin according to claim 1, organic silver salt, photosensitive silver halide and silver ion reducing agent.

* * * * *